United States Patent [19]
Krause

[11] 3,810,049
[45] May 7, 1974

[54] INTEGRATED ATTENUATION ELEMENTS

[75] Inventor: Gerhard Krause, Ebersberg, Germany

[73] Assignee: Siemens Aktiengesellschaft, Berlin and Munich, Germany

[22] Filed: Jan. 4, 1973

[21] Appl. No.: 321,032

[30] Foreign Application Priority Data
Jan. 24, 1972 Germany .......... 2203247

[52] U.S. Cl. .......... 333/81 R, 307/237, 307/299, 317/235 R
[51] Int. Cl. .......... H01p 1/22
[58] Field of Search ...... 333/7 D, 81 R, 81 A, 84 R, 333/84 M; 307/237, 299; 317/235 Y

[56] References Cited
UNITED STATES PATENTS

| | | | |
|---|---|---|---|
| 3,622,812 | 11/1971 | Crawford | 317/235 Y X |
| 3,070,711 | 12/1962 | Marcus et al. | 307/299 X |
| 3,432,778 | 3/1969 | Ertel | 333/81 R |
| 3,579,059 | 5/1971 | Widlar | 307/299 X |

*Primary Examiner*—Paul L. Gensler
*Attorney, Agent, or Firm*—Hill, Sherman, Meroni, Gross & Simpson

[57] ABSTRACT

An integrated attenuation element having a variable attenuation characteristic for high frequency signals comprises a semiconductor body of one conductivity type having at least three zones of the opposite conductivity type arranged in one face thereof. One of the zones serves as an input for high frequency signals and another of the zones serves as an output, while the third zone serves as a control electrode. An attenuation circuit which employs such an element includes means for applying control signals to the zones to control the attenuation of the element.

3 Claims, 5 Drawing Figures

INTEGRATED ATTENUATION ELEMENTS

CROSS REFERENCE TO RELATED APPLICATION

The subject matter of this application is related to that disclosed in my pending application, Ser. No. 321,031, filed on even date herewith.

BACKGROUND OF THE INVENTION

Field of the Invention

The present invention relates to integrated attenuation elements and more particularly to such attenuation elements having a variable attenuation characteristic for high frequency signals, and to circuit arrangements for use in the operation of such attenuation elements.

Description of the Prior Art

If radio and television receivers are operated in the vicinity of powerful transmitters, input voltages of the order of magnitude of 1V can occur. Powerful signals of this kind cannot be processed without distortion by control transistors located in the input circuit of the receiver, and thus cross-modulation and modulation distortions occur.

It is known to replace control transistors in the input circuit of the receiver by transistors with a relatively high collector current (of the order of 10mA) and a substantially linear characteristic in order to improve the strong signal properties of receivers. Transistors of this kind can in fact be subjected to input voltages which are greater by approximately one power of ten than the permissible voltage for control transistors. Such transistors cannot, however, be controlled.

It is also known to use a network of PIN diodes, preferably arranged before the first transistor in the receiver, for the purpose in question. PIN diodes are diodes which possess an intrinsic zone (indicated by I) between p-conducting and n-conduncting zones. Previously known PIN diode networks are however, relatively expensive. In order to achieve the necessary attenuation, networks of this kind generally consist of three discrete diodes. If such a network is to be integrated using monolithic integrated circuit technology, each diode must be arranged in an isolated island. Since, however, a PIN diode consists of a very thick (approximately 100 $\mu$) and very highly ohmic ( $< 1000$ $\Omega$/cm) material, very deep isolating diffusions must be effected to produce these isolated islands. This technique, however, gives rise to a disadvantage in that diffusion processes of this type reduce the carrier lifetime in the semiconductor to an intolerable extent due to the long heating period. Moreover, the behavior of the PIN diodes for signals having large amplitudes is also impaired. The area required is also very large owing to undesired, lateral diffusions. Finally, the large capacitive load due to the capacity of the isolating p-n junctions and the relatively high series impedance of the diodes is also disadvantageous.

SUMMARY OF THE INVENTION

It is an object of the present invention to provide an integrated attenuation element having a variable attenuation characteristic, in particular for the above mentioned purposes in which the disadvantages of the above-mentioned known arrangements are at least to a large extent avoided.

According to the invention, there is provided an integrated attenuation element having a variable attenuation characteristic for high frequency signals comprising a semiconductor body of one conductivity type in one face of which three zones of the other conductivity type are provided. One of the three zones serves as an input and a second of said zones serves as an output for the high frequency signals, and the third of said zones serves as a control zone. The semiconductor body is provided with a contact electrode on the opposite face to that in which the three zones are formed.

According to a further aspect of the invention a controllable attenuation circuit arrangement comprises such an attenuation element. The controllable attenuation circuit is provided with means for applying a control signal between the input zone and the contact electrode, which is decoupled to ground for high frequencies and also between the output zone and the contact electrode. The amplitude of the control signal is made variable in such a manner that for a minimum attenuation, it possesses a limit value at which the p-n junctions between the input and output zones and the semiconductor body are biased in the forward direction. To provide for an increasing attenuation up to a maximum attenuation the amplitude drops to a value at which the p-n junctions do not conduct control current. The controllable attenuation circuit is also provided with means for applying a second control signal between the control zone, which is connected to ground for high frequencies, and the contact electrode. The amplitude of this second control signal is variable in such a manner that for a minimum attenuation, it possesses a value at which the p-n junction between the control zone and the semiconductor body does not conduct current, and for increasing attenuation up to a maximum attenuation, the amplitude increases with a polarity at which the p-n junction continuously conducts current to an increasing extent.

BRIEF DESCRIPTION OF THE DRAWINGS

Other objects, features and advantages of the invention, its organization, construction and operation will be best understood from the following detailed description taken in conjunction with the accompanying sheet of drawing, on which.

DESCRIPTION OF THE PREFERRED EMBODIMENTS

Figure 1:
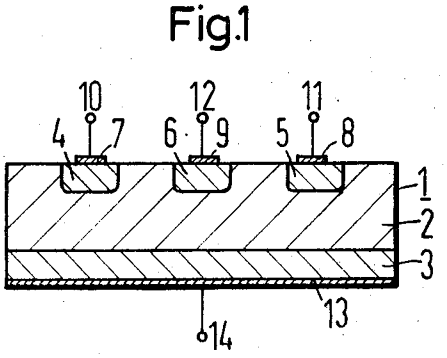
FIG. 1 is a schematic side sectional view of a first embodiment of the invention.

In the embodiment shown in FIG. 1, in one face of a semiconductor body 1 which, for example, may be a weakly n-conducting monocrystalline silicon with a phosphorus-doping concentration of approximately $10^{12}cm^{-3}$, there are provided three highly doped p-conductive zones 4, 5 and 6, which can be produced, for example, by boron diffusion with a concentration of approximately $5 \times 10^{20} cm^{-3}$. On the opposite face of the semiconductor body 1 there is provided a highly doped n-conductive zone 3, extending over the entire surface of this face of the semiconductor body 1, which zone can be produced, for example, by a phosphorus diffusion with a concentration of approximately $3 \times 10^{20} cm^{-3}$. With this configuration, a weakly conductive zone 2 of the original semiconductor body 1 remains between the zones 4, 5 and 6 and the zone 3.

The zones 4, 5 and 6 are provided with contact electrodes 7, 8 and 9 respectively which are connected to terminals 10, 11 and 12. Similarly, the entire surface of the zone 3 is provided with a contact electrode 13 which is connected to a terminal 14.

Preferably the zones 4, 5 and 6 are arranged aligned with respect to one another in a row.

Figure 2:
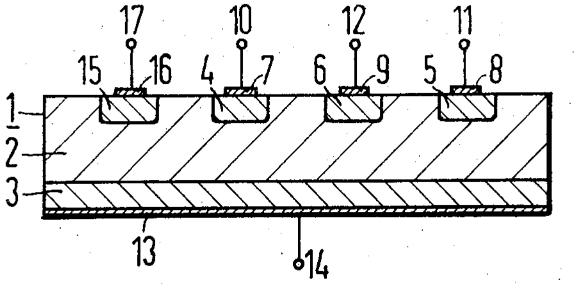
FIG. 2 is a similar view to that of FIG. 1 of a second embodiment of the invention.

In the embodiment of the invention represented in FIG. 2 an electrode is provided in the vicinity of the input zone 4, which electrode is formed by an n-conducting further zone 15 with a contact 16, which is connected to terminal 17. This zone 15, which is preferably, but not necessarily, highly n-conducting, can be produced, for example, by phosphorus diffusion with a concentration of $3 \times 10^{20} cm^{-3}$. In other respects, this embodiment corresponds to that of FIG. 1, identical elements being given the same reference numerals in the two FIGS. 1 and 2.

The further zone 15, is not absolutely essential in this embodiment; if the zone 15 is not provided, the contact 16 alone can be provided at this point and carried directly on the semiconductor body 1.

Figure 3:
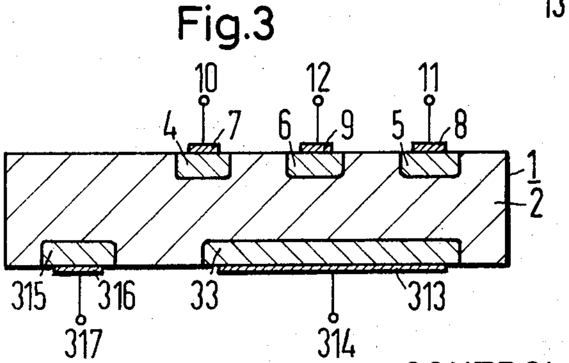
FIG. 3 is a similar view to that of FIG. 1 of a third embodiment of the invention.

In the embodiment shown in FIG. 3, a zone 315 which corresponds to the zone 15 in the embodiment of FIG. 2 is provided in the vicinity of the input zone 4 but on the opposite face of the semiconductor body 1 to that in which the zone 4 is formed. The zone 315 is provided with a contact 316 connected to a terminal 317. In this embodiment, a zone 33 corresponding to the zone 3 shown in FIGS. 1 and 2 occupies only a part of the opposite face of the semiconductor body 1. The contact electrode for this zone which is connected to a terminal 314, also possesses corresponding dimensions.

In this embodiment also, the zone 315 is not absolutely essential; if the zone 315 is not provided, the contact 316 alone can be provided at this point and carried directly on the semiconductor body 1.

The operation of the circuit arrangement shown in FIG. 4 which includes an attenuation element in accordance with the invention as shown in FIG. 2 will now be described.

In this circuit arrangement, a high frequency input signal which is to be attenuated is fed into an input terminal 40 and thence through a coupling capacitor 41 to the input zone 4. The input zone 4 is also connected via a resistor 45 and a terminal 44 to a control signal source which itself is connected to the terminal 44 and to ground. Similarly, the output zone 5 is connected through a resistor 46 to the control signal source. The attenuated output signal is withdrawn through a coupling capacitance 51 and an output terminal 50.

The control zone 6 is connected through a resistor 48 and a terminal 47 to a further control signal source which itself is connected to terminal 47 and to ground.

A capacitor 49 connected to ground forms a short-circuit for the control zone 6 for high frequencies.

The contact electrode 13 (and correspondingly the electrode 313 in the embodiment shown in FIG. 3) is connected to ground through a choke 52, which blocks the signal frequency.

If the control voltage applied to the terminal 44, which may be a d.c. voltage or an a.c. voltage with a very low frequency in comparison with the signal frequency, is positive with respect to ground then the p-n junctions formed between the input and output zones 4 and 5, respectively, and the region 2 of the semiconductor body 1, are biased in the forward direction when the conductivity types of these zones are as stated above. Holes therefore diffuse out of the zones 4 and 5 across the p-n junctions into the region 2. Correspondingly, electrons diffuse out of the highly doped zone 3 into the region 2. As this region 2 is as previously stated, weakly doped in comparison to the zones 3, 4 and 5, the density of the moving charge carriers diffusing out of these zones across the p-n junctions is very much greater than the density of the doping atoms in the region 2. Therefore, the differential resistance between the zones 4 and 5 and the zone 3 is lower by several powers of ten, than the state when there is no control signal applied to the terminal 44.

If a zero voltage or a negative voltage is simultaneously applied to the terminal 47, then the p-n junction between the control zone 6 and the region 2 is blocked so that no current flows across the region 2.

In this state of a low differential resistance in the zone 2, the high frequency signal applied to the terminal 40 can pass across the p-n junctions of the zones 4 and 5 which are biased in the forward direction to the output terminal 50. In this state, there is therefore no substantial attenuation (the attenuation is, for example, less than 1 dB).

If, on the other hand, zero voltage, or a negative voltage relative to ground, is applied to the terminal 44, then the p-n junctions between the zones 4 and 5 and the region 2 are blocked. If a positive control voltage, relative to ground is simultaneously applied to the terminal 47, then the p-n junction between the control zone 6 and the region 2 is biased in the forward direction. Holes are therefore injected from the control zone 6 and electrons from the zone 5 into the region 2, so that the differential resistance of the path between the control zone 6 and the zone 3 becomes very low (for example approximately 5 ohm with a control current of 10 mA). Since in this state, the p-n junction between the input zone 4 and the region 2 is blocked, the high frequency input signal applied to the input terminal 40 can pass from the input zone 4 to the output zone 5 only via the relatively small blocking layer capacitance of this p-n junction (e.g. approximately 0.3pF). Since, however, the path between the control zone 6 and the zone 3 is conductive, and since the control zone 6 is connected to ground for high frequencies via the capacitor 49, the high frequency input signal is practically entirely shunted to ground. The small residual signal voltage remaining in the zone 3 can reach the output 50 only via the small blocking layer capacitance of the p-n junction between the output zone 5 and the region 2, whereby the signal is further attenuated.

The attenuations which may be achieved with an attenuation element of this kind are above 40 dB, for example, for a frequency of 800 MHz, and increase further with lower frequencies.

In order to obtain intermediate attenuation values, the above mentioned control signals can be continuously varied between the extreme values. This variation takes place automatically in receivers, the attenuation element being employed at the control element of the control circuit.

The control zone 6 possesses the further advantage that it represents a shield between the input zone 4 and the output zone 5, as a result of which an undesired capacitance between the terminals 10 and 11 is avoided or reduced. The zones 4, 5 and 6 do not need to be identical in dimensions. In particular, the area of the control zone 6 can be larger, as a result of which the signal can be discharged to ground via a low resistance.

In the mode of operation of the attenuation element a mismatch to an input line (not shown) connected to the input terminal 40 can occur. To avoid mismatches of this kind, in the embodiments of FIGS. 2 and 3, a further zone 15 or 315 is provided. As already explained above, these zones are highly doped in comparison to the region 2 of the semiconductor body 1, but are of the same conductivity type.

Figure 4:
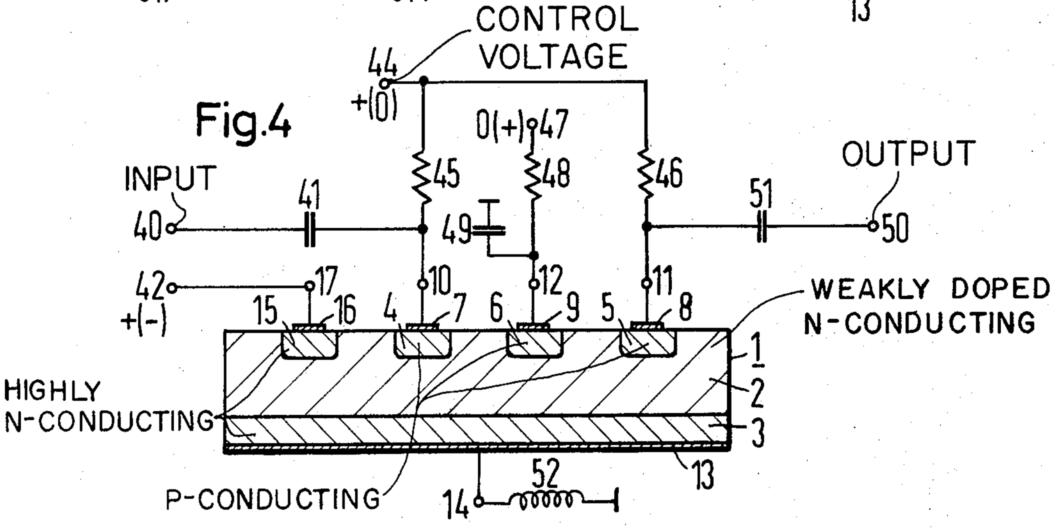
FIG. 4 is a schematic side sectional view of the embodiment of FIG. 1 connected in a circuit arrangement.

The embodiment of FIG. 2 is shown connected into the circuit of FIG. 4. However, it should be noted that when the embodiment of FIG. 3 is similarly connected into the circuit shown in FIG. 4, the same effect with respect to the above-mentioned matching is achieved.

In the case of high attenuations, the zero control voltage, or a negative control voltage relative to ground, is applied to the terminal 44, a positive control voltage relative to ground is applied to the terminal 47 and a negative control voltage is applied to a terminal 42 connected to the terminal 17 of the attenuation element. Furthermore, the zone 15 is connected to ground for high frequencies. A control current which flows across the input zone 4 with these potential distributions therefore flows away via the zone 15 in the event of high attenuations. The control current flowing between the terminals 10 and 17 can be so selected that the differential resistance for the signal frequency between these terminals is approximately equal to the surge impedance of the signal line connected to the input terminal 40. Reflections of the input signal are therefore prevented.

If the control current commences to flow between the input zone 4 and the output zone 5 with a lower degree of attenuation, the control current between the zones 4 and 5 is reduced to such an extent that the resultant input impedance of the attenuation element is approximately equal to the surge impedance of the input signal line. As the attenuation is reduced, the control current between the input zone 4 and the zone 15 tends towards zero.

It should be noted that the potentials applied to the terminals 42, 44 and 47 which are shown in FIG. 4 for operation with a low attenuation (and also for operation with high attenuation), do not necessarily have to possess the distribution shown. For example, negative voltages can also be applied in place of the zero potentials and voltages. The only requirement is that for the various given operational states with different attenuations, potential differences should be present which leads to the given current distributions at the various p-n junctions.

Figure 5:
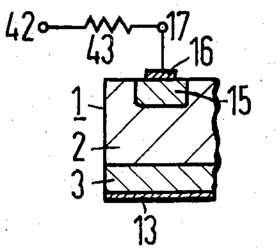
FIG. 5 is a schematic side sectional view of a part of a modified form of the circuit arrangement of FIG. 4.

If the differential resistance between the input zone 4 and the other zone 15, or, in the embodiment shown in FIG. 3 the zone 315, in the event that maximum control current flowing between these zones is lower than the surge impedance of an input signal line connected to the input terminal 40, a matching resistor 43 can be connected into the line connecting the terminal 42 to the zone 15, as shown in FIG. 5.

The invention is not limited to the embodiments illustrated in the drawing and described above. For example, a plurality of the such attenuation elements can be arranged in a semiconductor body, and may be connected in series to increase the attenuation. It is also not absolutely necessary to provide the highly doped zone 3 and 33 in the attenuation element. In an embodiment shown in FIG. 1, the electrode 13 may then be directly applied to the region 2 of the semiconductor body 1. Finally, the passive components which are connected to the attenuation element shown in FIG. 4 can also be directly integrated into the semiconductor body 1.

Although I have described my invention by reference to specific illustrative embodiments, changes and modifications may become apparent to those skilled in the art without departing from the spirit and scope of the invention. I therefore intend to include within the patent warranted hereon all such changes and modifications as may reasonably and properly be included within the scope of my contribution to the art.

I claim:

1. A controllable attenuation circuit arrangement comprising: an attenuation element comprising a semiconductor body of one conductivity type having a pair of opposite surfaces, three zones of the opposite conductivity type provided in one of said surfaces, a first of said three zones serving as an output for the high frequency signals, a second of said three zones serving as an input for the high frequency signals, and the third of said zones serving as a control zone, and a contact electrode carried on said semiconductor body on the surface opposite to that having said three zones; means for applying a first control signal between said first zone and said contact electrode and between said second zone and said contact electrode, the amplitude of said first control signal being variable in such a manner that for minimum attenuation said first control signal has a limit value at which the p-n junctions between said input and output zones and said semiconductor body are biased in the forward direction and for increasing attenuation up to a maximum attenuation the amplitude drops to a value at which said p-n junctions do not conduct control current; means for decoupling said contact electrode with respect to ground for high frequencies; means for coupling said control zone to ground for high frequencies; and means for applying a second control signal between said control zone and said contact electrode, the amplitude of said second control signal being variable in such a manner that for a minimum attenuation said second control signal has a limit value at which the p-n junction between said control zone and said semiconductor body does not conduct current and for increasing attenuation up to a maximum attenuation the value of said second control signal increases with a polarity at which said p-n junction continuously conducts current to an increasing extent.

2. A circuit arrangement as claimed in claim 1 comprising a further electrode including a further zone of said one conductivity type arranged in said semiconductor body adjacent said input zone; a contact carried on said further zone; and means for providing a further control signal between said further electrode and said contact electrode, the amplitude of said further control signal being variable in such a manner that at high attenuations there is a potential difference between said input zone and said further zone at which the differential resistance between said input zone and said further zone is approximately equal to the surge impedance of an input line adapted to be connected to said input zone.

3. A circuit arrangement as claimed in claim 2, comprising a matching resistor connected in circuit with said further electrode and said means for applying said further control signal.

* * * * *